US00RE35786E

United States Patent [19]

Ohara

[11] E Patent Number: Re. 35,786

[45] Reissued Date of Patent: May 5, 1998

[54] TELEVISION GAME APPARATUS

[75] Inventor: Makoto Ohara, Botan Koto-ku, Japan

[73] Assignee: Sega Enterprises, Ltd., Tokyo, Japan

[21] Appl. No.: 336,829

[22] Filed: Nov. 9, 1994

Related U.S. Patent Documents

Reissue of:

[64] Patent No.: 5,161,803
Issued: Nov. 10, 1992
Appl. No.: 710,520
Filed: Jun. 3, 1991

[30] Foreign Application Priority Data

Jun. 14, 1990 [JP] Japan ..... 2-155838

[51] Int. Cl.[6] ..... D63F 5/22

[52] U.S. Cl. ..... 463/44; 463/48

[58] Field of Search ..... 463/44, 48

[56] References Cited

U.S. PATENT DOCUMENTS 4,352,492 10/1982 Smith .
4,763,300 8/1988 Yukawa .

FOREIGN PATENT DOCUMENTS 0378385 1/1990 European Pat. Off. .
3032337 8/1980 Germany .
60-052179 3/1985 Japan .
2273388 11/1990 Japan .
388 587 9/1991 Japan .
3122894 12/1991 Japan .
3126187 12/1991 Japan .
418577 2/1992 Japan .
565387 8/1993 Japan .
2033763 5/1980 United Kingdom ..... 273/88
8302566 3/1982 WIPO .

*Primary Examiner*—Jessica Harrison
*Assistant Examiner*—Michael O'Neill
*Attorney, Agent, or Firm*—Price, Gess & Ubell

[57] ABSTRACT

A television game set comprises an operation button used to operate a game, a game control section for controlling the game, a display section for displaying the progress of the game, and a connector to which either a game cartridge storing a game program therein or a tuner cartridge for receiving television broadcasting is coupled. At least one terminal of the connector is used to handle a cartridge changeover signal. The other terminals of the connector are changed in function on the basis of the cartridge changeover signal received on the one terminal as to handle either game signals or tuner signals.

18 Claims, 4 Drawing Sheets

Fig. 4.
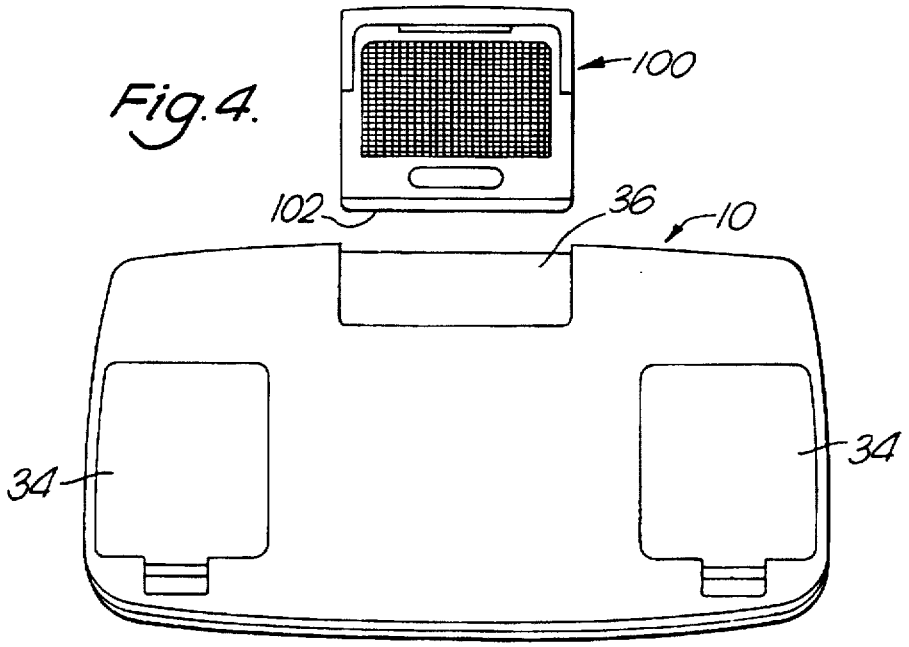
Fig. 5(a).
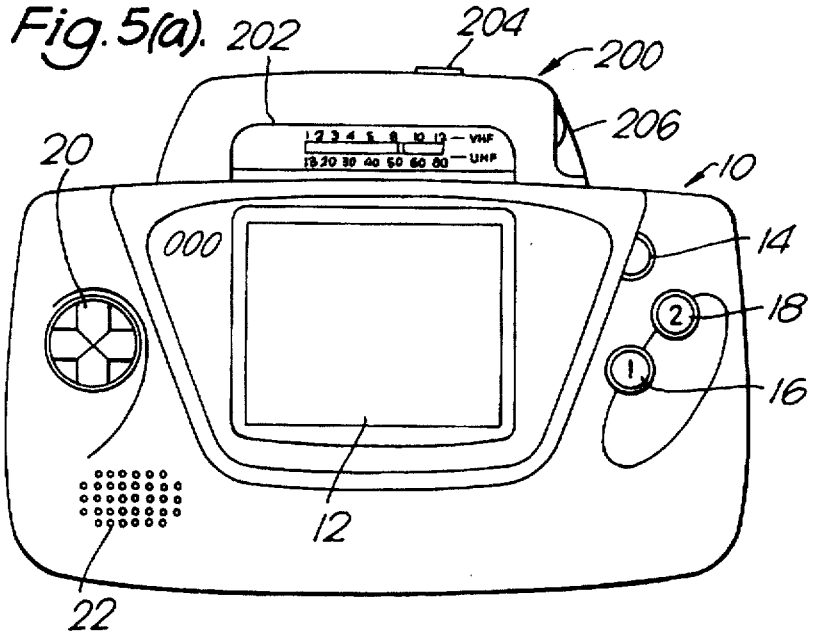
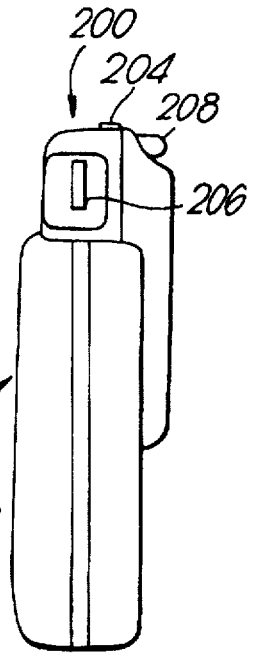
Fig. 5(b).

TELEVISION GAME APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a television game set with which anyone can play various games by changing game cartridges.

2. Description of the Prior Art

Television game sets with which anyone can play various games by changing game cartridges are classified into two types: one displaying the progress of a game on the screen of a television receiver and the other displaying the progress of a game on a built-in display screen.

The first type of television game set in which the progress of a game is displayed on the screen of a television receiver, although the quality of display is superior, has the disadvantage that one cannot enjoy a game anywhere, except in a room where a television receiver is held.

On the other hand, the second type of television game set in which the progress of a game is displayed on a built-in display screen, although it is portable so that one can play a game anywhere, has the disadvantage that the quality of display is inferior.

Therefore, in view of superior display quality, most of the conventional television game sets were made to utilize the screen of a television receiver.

In recent years, liquid crystal technology has progressed, so that the quality of a display screen usable in portable television game sets was enhanced, a color display screen also became usable, and the use of such screens has been put into practice. Thus, it is proposed to operate a television game set having a high-quality display screen as a portable television receiver when no television game is played.

To realize such proposal or display of a television broadcasting program on the display screen of a television game set, a large number of signal lines are required, and independently of a small-size connector for game signals, a portable television game set must be equipped with a large-size connector to receive television broadcasting signals.

SUMMARY OF THE INVENTION

It is an object of the present invention to provide a television game set capable of handling television broadcasting, as well as television games, without the need for a large-size connector.

To accomplish the foregoing object, the present invention provides a television game set which comprises an operation button or control used to operate a game, a game control section for controlling the game, a display section for displaying the progress of the game, and a connector to which either a game cartridge storing a game program therein or a tuner cartridge for receiving television broadcasting is coupled, and is characterized in that at least one terminal of the connector is used to handle a cartridge changeover signal, and the other terminals of the connector are changed in function on the basis of the cartridge changeover signal received on the one terminal as to handle either game signals or tuner signals.

As will be appreciated, according to the present invention, the type of the cartridge loaded is determined on the basis of the changeover signal, and the terminals of the connector are changed in function correspondingly; therefore, the reception of the television broadcasting through the tuner cartridge can be attained by the use of one connector whose number of terminals is limited to that necessary for the game cartridge, that is, there is no need for any large-size connector.

BRIEF DESCRIPTION OF THE DRAWINGS

FIG. 4 is a view showing a game cartridge before being loaded into the television game set;

FIGS. 5(a) and 5(b) are views showing a tuner cartridge loaded in the television game set;

DETAILED DESCRIPTION OF THE PREFERRED EMBODIMENT

The external appearance of an embodiment of a television game set according to the present invention will be described with reference to FIGS. 1 through 5.

Figure 1:
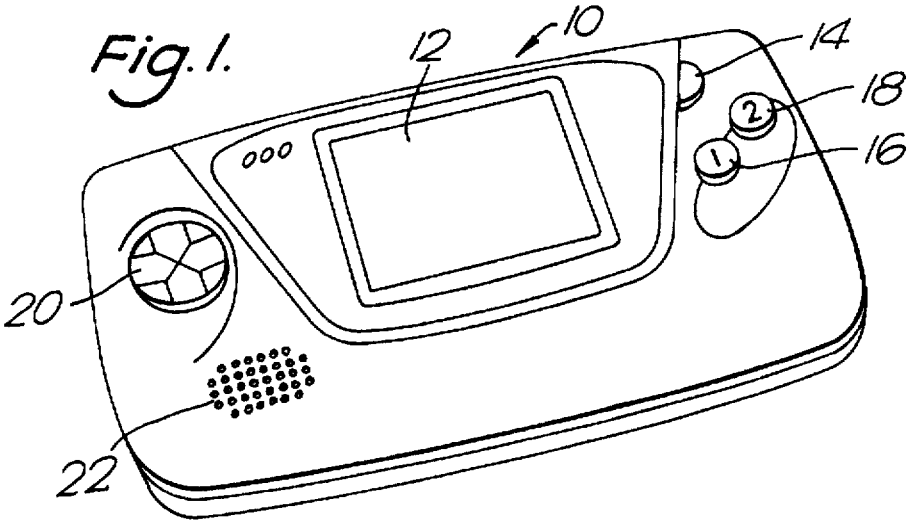
FIG. 1 is a perspective view showing an embodiment of a television game set according to the present invention.

FIG. 1 is a perspective view of a television game set. The television game set 10 has a color liquid crystal display panel 12 serving as a display section which is provided in a central portion of the front face. Provided on the right side of the liquid crystal display panel 12 are a pause button 14 used to halt game and "1" and "2" buttons 16 and 18 used to control game play, these serving as operation buttons. Provided on the left side of the liquid crystal display panel 12 are a "cross" control button 20 used also to control game play which serves as an operation button and a speaker 22 for generating a game sound.

Figure 2:
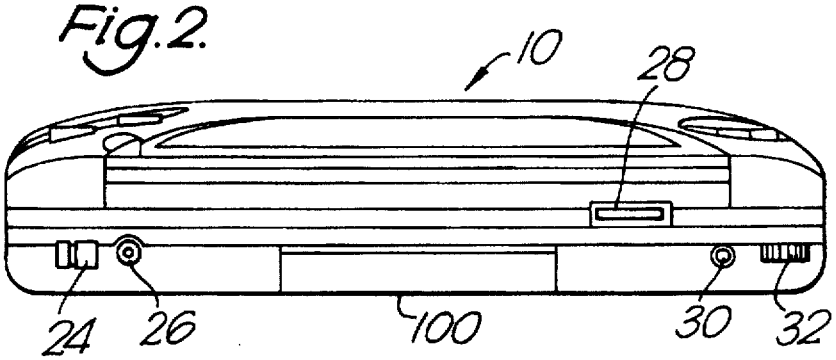
FIG. 2 is a top view of the television game set.
Figure 3:
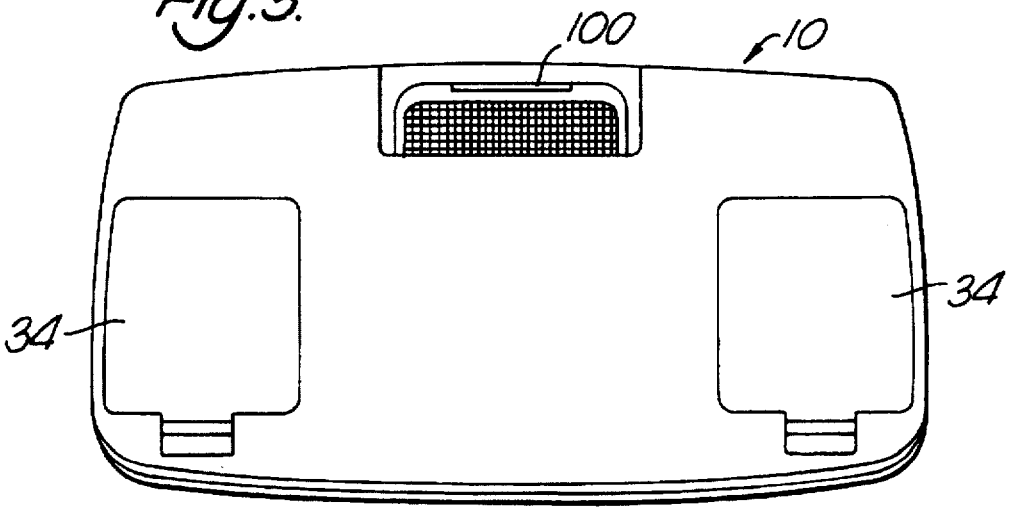
FIG. 3 is a back view of the television game set.

FIG. 2 is a side view of the television game set in which a game cartridge is loaded, and FIG. 3 is a back view.

Provided in an upper left-hand portion of the television game set 10 are a power switch 24 used to turn on/off source power and a power jack 26 for accepting a d.c. adapter. Provided in an upper right-hand portion of the television game set 10 are a communication connector 28 for transmission of data in relation to the outside, a headphone jack 30 for connection with a headphone from which the game sound is heard, and a sound controller 32 used to regulate the game sound.

Provided in the back face of the television game set 10 are two battery boxes 34 spaced laterally for accommodating power batteries (not shown). A game cartridge 100 is loaded in a central portion of the back face of the television game set 10.

As shown in FIG. 4, the game cartridge 100 is made rectangular so as to be completely stored in a recess 36 formed in a central portion of the back face of the television game set 10, and has a connector 102 provided in a lower portion thereof. When the game cartridge 100 is loaded, the connector 102 is connected to a connector 38 provided in the recess 36 of the television game set 10.

FIG. 5 shows a tuner cartridge 200 loaded in the television game set 10, in which (a) is a front view and (b) is a side view.

The tuner cartridge 200 is shaped such that its head portion projects from the television game set 10 in the loaded state. Arranged above the liquid crystal display panel 12 of the television game set 10 is a TV broadcasting channel display section 202. Provided above the TV broadcasting channel display section 202 is a VHF/UHF changeover switch 204 used to choose VHF or UHF, and provided on the right side of the switch 204 is a tuning controller 206 used to perform TV broadcasting tuning. A rod antenna 208 for receiving TV broadcasting is attached to an upper portion of the tuner cartridge 200.

The television game set 10, game cartridge 100, and tuner cartridge 200 will be described in greater detail with reference to the block diagrams of FIGS. 6 through 8.

Figure 6:
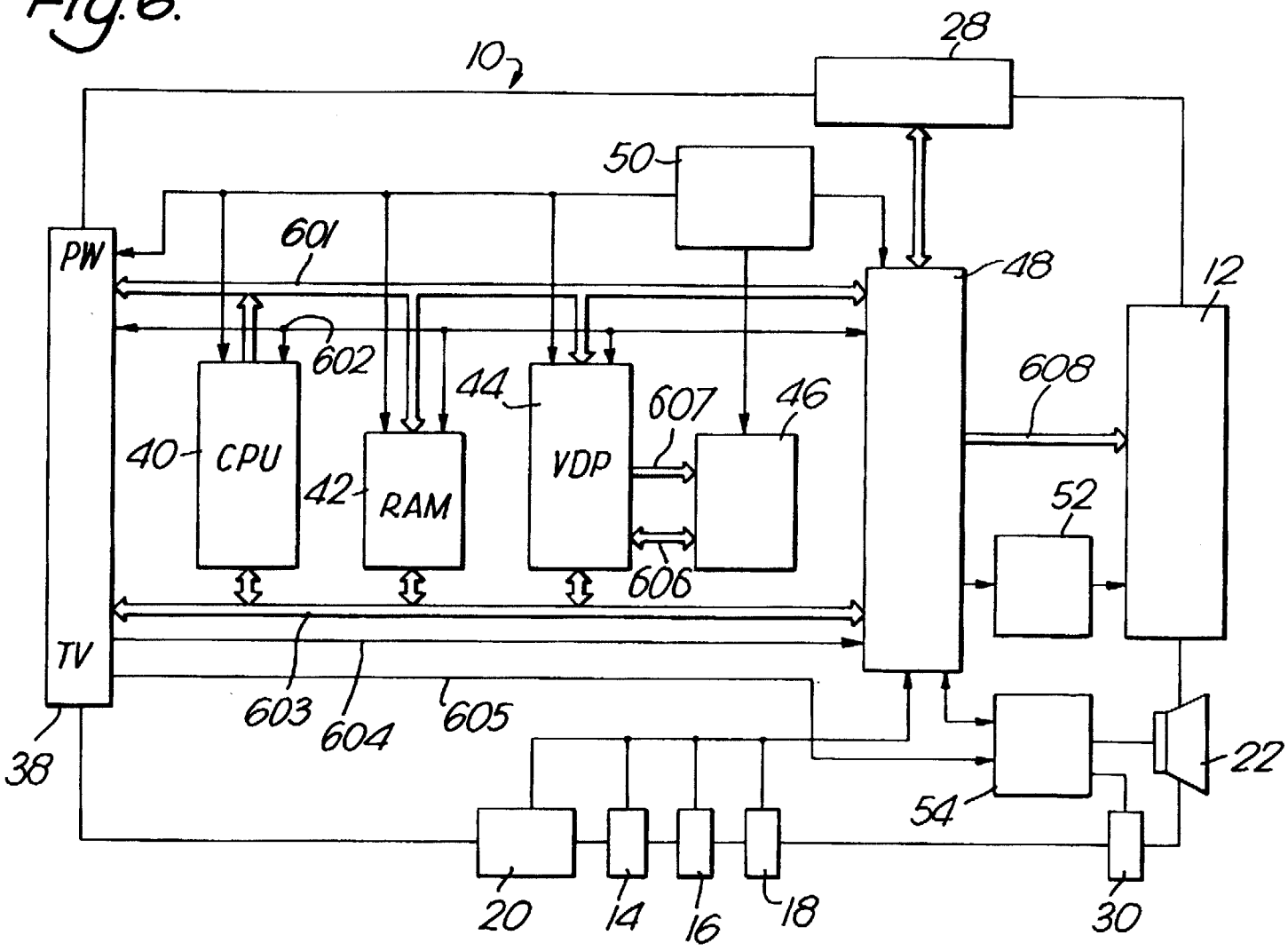
FIG. 6 is a block diagram of the television game set.
Figure 7:
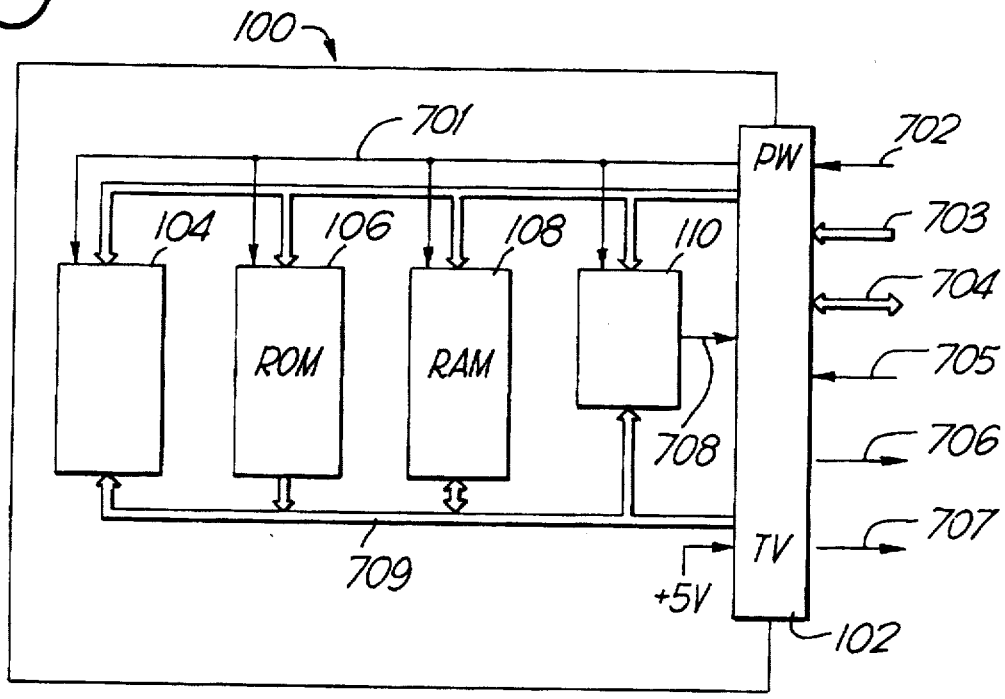
FIG. 7 is a block diagram of the game cartridge.

As shown in FIG. 6, the television game set 10 comprises a CPU 40 for controlling the whole system and a scratch RAM 42 in which a variety of data is written by the CPU 40 as needs demand. There are further provided a VDP (video display processor) 44 for generating a video signal for a television game and a video RAM 46 in which data necessary for generation of the video signal is stored. There is further provided a control circuit 48 made of a standard cell array which is designed for exclusive use [int he] *in the* television game set 10.

A power circuit 50 is provided to supply source power to the CPU 40, scratch RAM 42, VDP 44, video RAM 46, and control circuit 48.

A display signal for liquid crystal driving is delivered from the control circuit 48 to the liquid crystal display panel 12. The liquid crystal display panel 12 is supplied with power from an independent power circuit 52.

A sound signal becoming a sound output is delivered from the control circuit 48 to a sound amplifier circuit 54. This sound amplifier circuit 54 is connected to the speaker 22 and the headphone jack 30.

To control the progress of a television game, the pause button 14, "1" 16, "2" button 18, and "cross" control button 20 are connected to the control circuit 48. To transmit data in relation to the outside, the control circuit 48 is connected further to the communication connector 28.

The connector 38 for connection with the cartridge has, for example, 45 pins. The connector 38 receives and delivers such signals as a power signal PW from the power circuit 50, an address or display signal, a control signal, a data or display signal, a changeover signal TV, and a sound signal.

The address or display signal is received by or delivered from the CPU 40, scratch RAM 42, VDP 44, and control circuit 48. The control signal is received by or delivered from the CPU 40, scratch RAM 42, VDP 44, and control circuit 48. The data or display signal is received by or delivered from the CPU 40, scratch RAM 42, VDP 44, and control circuit 48. The changeover signal TV is received by the control circuit 48. The sound signal is received by the sound amplifier circuit 54. [as] *As* shown in FIG. 7, the game cartridge 100 comprises a gate array 104 and a ROM 106 in which a game program is stored, a RAM 108 in which a variety of data is written as a game demands, and a sound circuit 110 for generating the sound signal on the basis of sound data stored in the ROM 106.

The connector 102 has 45 pins similarly to the connector 38 of the television game set 10. The connector 102 receives and delivers such signals as the power signal PW, address signal, data signal, control signal, sound signal, and changeover signal TV.

The power signal PW is received by the gate array 104, ROM 106, RAM 108, and sound circuit 110, and power is supplied from the outside through the connector 102. The address signal is received by the gate array 104, ROM 106, RAM 108, and sound circuit 110. The data signal is received by or delivered from the gate array 104, ROM 106, RAM 108, and sound circuit 110. The sound signal is delivered from the sound circuit 110. As the changeover signal TV, a +5 V signal is delivered through the connector 102 to the television game set 10.

Figure 8:
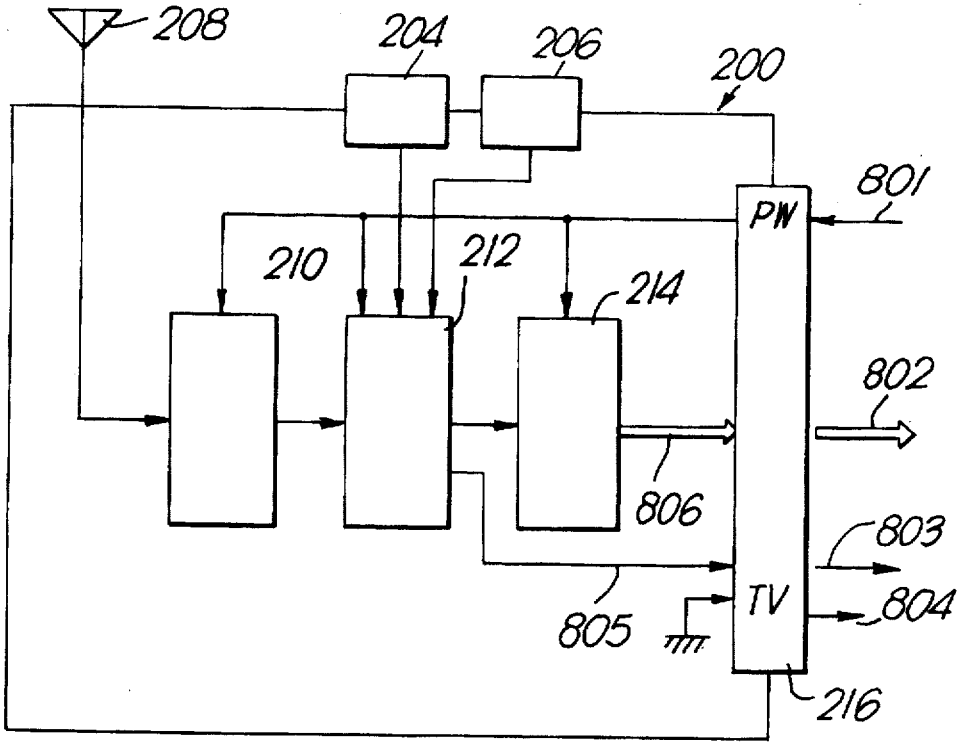
FIG. 8 is a block diagram of the tuner cartridge.

As shown in FIG. 8, the tuner cartridge 200 comprises a TV broadcasting receiving circuit 210 for receiving and amplifying a TV broadcasting signal, a demodulator circuit 212 for demodulating the TV broadcasting signal received, and a display-signal generating circuit 214 for generating the display signal being applied to the liquid crystal display panel 12.

A connector 216 provided in the tuner cartridge 200 has 45 pins similarly to the connector 38 of the television game set 10. The connector 216 receives and delivers such signals as the power signal PW, display signal, sound signal, and changeover signal TV.

The power signal PW is received by the TV broadcasting receiving circuit 210, demodulator circuit 212, and display-signal generating circuit 214, and power is supplied from the outside through the connector 216. The display signal is delivered from the display-signal generating circuit 214. The sound signal is delivered from the demodulator circuit 212. As the changeover signal TV, a 0 V signal is delivered through the connector 216 to the television game set 10.

The TV broadcasting signal received by the rod antenna 208 is received and amplified by the TV broadcasting receiving circuit 210 and then delivered to the demodulator circuit 212. The demodulator circuit 212 demodulates the TV broadcasting signal of a channel selected by the tuning controller 206 on the basis of a frequency band chosen by the VHF/UHF changeover switch 204, and delivers a "RGB" picture signal and a sound signal. The picture signal is converted by the display-signal generating circuit 214 into a display signal which can be applied directly to the liquid crystal display panel 12 of the television game set 10. The sound signal is delivered through the connector 216 to the outside.

The operation of the television game set 10 when the cartridge is loaded thereinto will be described.

Both the connector 102 of the game cartridge 100 and the connector 216 of the tuner cartridge 200 are made mechanically fitable to the connector 38 of the television game set 10; thus, either type of cartridge can be loaded into the television game set 10. However, since the television game set 10 is designed inherently for the purpose of enjoyment of the television game, the number of pins of the connector 38 is limited to that of signal lines necessary for the game cartridge 100.

To solve the problems of limitation in the number of pins, in the embodiment, the changeover signal from the cartridge loaded is used to determine the type of cartridge; consequently, the terminals of the connector 38 are changed in function on the basis of the type of the cartridge loaded. Specifically, the game cartridge 100 delivers +5 V as the changeover signal TV, whereas the tuner cartridge 200 delivers 0 V as the changeover signal TV. The control circuit 48 of the television game set 10 determines the type of the cartridge loaded on the basis of the changeover signal TV received through the connector 38 which is either 0 V or 5 V.

When the game cartridge 100 is loaded into the television game set 10, the changeover signal TV of 5 V is applied through the connector 102 and 38 to the control circuit 48 of the television game set 10. The control circuit 48 determines on the basis of the changeover signal TV that the cartridge just loaded is the game cartridge 100; as a result, the CPU 40 is actuated as to perform television game playing in conjunction with the television game set 10, the terminals of the connector 38 are changed in function as to handle game signals, the game signals are transmitted between the television game set 10 and the game cartridge 100 through the connectors 38 and 102, and thus, the television game is played. The picture of the television game is displayed on the liquid crystal display panel 12, and the sound of the television game is emitted from the speaker 22.

When the tuner cartridge 200 is loaded into the television game set 10, the changeover signal TV of 0 V is applied through the connectors 102 and 38 to the control circuit 48 of the television game set 10. The control circuit 48 determines on the basis of the changover signal TV that the cartridge just loaded is the tuner cartridge 200; as a result, the CPU 40 is put in the reset state, and the terminals of the connector 38 are changed in function as to handle television broadcasting signals so that the television broadcasting can be received.

In the embodiment, "Z80" (made by Toshiba Co.) is used as the CPU 40. The "Z80" is reset upon receipt of three clock pulses while it is receiving a reset signal. By putting the CPU 40 in the reset state, the signal lines used for transmission of the address and data signals are used for transmission of the display signal during television game playing. When it is determined that the cartridge just loaded is the tuner cartridge 200, the control circuit 48 delivers three of more (e.g. seven) clock pulses together with the reset signal to the CPU 40.

After the CPU 40 is reset, the terminals of the connector 38 are changed in function as to handle the television broadcasting signals, and the display signal from the tuner cartridge 200 is received through the connectors 38 and 102. The control circuit 48 delivers the display signal received in place of the address and data signals to the liquid crystal display panel 12, so that the television broadcasting picture is displayed. The sound signal of the television broadcasting is delivered from the tuner cartridge 200 through the connectors 38 and 102 and amplified by the sound amplifier circuit 54, so that it is emitted from the speaker 22.

As described above, in the embodiment, the type of the cartridge loaded is determined on the basis of the changeover signal, and the terminals of the connector are changed in function correspondingly; therefore, the reception of the television broadcasting through the tuner cartridge can be attained by the use of one connector whose number of terminals is limited to that necessary for the game cartridge, that is, there is no need for any large-size connector.

The present invention should not be limited to the foregoing embodiment and may be modified to some extent.

For example, although the embodiment uses "Z80" as the CPU which is reset in a given manner such that some signal lines are released, a different product may be used as the CPU which is reset in a designated manner such that some signal lines are released.

As described above, the present invention makes it possible not only to play the television game but also to receive the television broadcasting without the need for a large-size connector.

What is claimed is:

1. In a video game system having a housing, a display screen, means for driving the display screen, operator controls, a game cartridge, and a connector port for receiving the game cartridge, the improvement comprising:

a tuner cartridge for inputting television broadcasting signals to the means for driving the display screen, the connector port electronically connecting either the tuner cartridge for providing a function of having the display screen of the video system provide a television broadcast image or the game cartridge for playing a stored game on the display screen.

2. The invention or claim 1 wherein the tuner cartridge includes an antenna for receiving broadcast television signals.

3. The invention of claim 2 wherein the tuner cartridge includes a broadcast channel display for permitting the operator to select a frequency channel.

4. A combination video game system and television receiver system having a housing with a display screen capable of providing game play images from game cartridges, means for driving the display screen to provide images, and operator controls on the housing for controlling images on the display screen, comprising:

a connector port for providing electrical connections to game cartridges on the housing, and a television tuner cartridge for inputting television broadcasting signals to the means for driving the display screen, the connector port electrically connecting one of the television tuner cartridges for providing a function of having the display screen provide a television broadcast image and a game cartridge for playing a stored game on the display screen.

5. The invention of claim 4 wherein the television tuner cartridge includes an antenna for receiving broadcast television signals.

6. The invention of claim 5 wherein the television tuner cartridge includes operator tuning controls for controlling the broadcast of television signals.

7. The invention of claim 6 wherein the television tuner cartridge includes broadcast channel display for permitting the operator to select a frequency channel.

8. The invention of claim 4 wherein the television tuner cartridge includes broadcast channel display for permitting the operator to select a frequency channel.

9. The invention of claim 4 wherein the means for driving the display screen includes a computer circuit.

10. The invention of claim 4 wherein the connector port includes a plurality of terminal pins and means for changing the function of the terminal pins depending on whether a game cartridge or a television tuner cartridge are inserted.

11. A combination video game system and television receiver system, comprising:

a housing member;

a display screen on the housing member;

at least one game cartridge storing a game;

means for driving the display screen in accordance with the stored game including operator controls;

a television tuner cartridge for inputting television broadcasting signals to the display screen, and a connector port on the housing member for removably making an electrical connection with one of the game cartridge and television tuner cartridge.

12. A hand-held video system capable of providing game play and display of television broadcasting signals, comprising:

a housing member dimensionally sized to beheld in an operator's hands for game play;

a display screen on the housing member;

at least one game cartridge storing a game;

a television tuner cartridge for inputting television broadcasting signals to the display screen, the game cartridge and television tuner cartridge being removably mounted on the housing member, and a connector port on the housing member for removably making an electrical connection with one of the game cartridge and television tuner cartridge.

13. The invention of claim 12 wherein the connector port has a plurality of terminal pins for mutually engaging with respectively the game cartridge and television tuner cartridge when inserted in the port and means for changing the function of the terminal pins depending on whether a game cartridge or a television tuner cartridge are inserted.

14. The invention of claim 13 wherein the television tuner cartridge includes an antenna for receiving broadcast television signals.

15. The invention of claim 14 wherein the television tuner cartridge includes operator tuning controls for controlling the broadcast of television signals.

16. The invention of claim 15 wherein the television tuner cartridge includes a broadcast channel display for permitting the operator to select a frequency channel.

*17. A hand-held video system capable of providing game play and display of television broadcasting signals, comprising:*

*a housing member dimensionally sized to be held in an operator's hands for game play;*

*a display screen on said housing member;*

*a connector port on said housing member for removably making an electrical connection with one of a game cartridge and a television tuner cartridge, said connector port comprising terminals for receiving game programs from the game cartridge and terminals for receiving television display and sound signals from the television tuner cartridge;*

*game controlling means for controlling the progress of the game when the game cartridge is connected to said connector port;*

*display controlling means for displaying the progress of the game on said display screen when the game cartridge is connected and for displaying television signals on said display screen when the television tuner cartridge is connected to said connector port;*

*means for determining whether a game cartridge or a television tuner cartridge is connected to the connector port; and*

*means for driving the display controlling means in response to the means for determining.*

*18. A television tuner cartridge for use in a hand-held video system capable of providing game play and display of television broadcasting signals, said hand-held video system comprising a housing member, a display screen on said housing member, a game control on said housing member for operating a game, a connector port on said housing member for removably making an electrical connection with a game cartridge and for receiving game programs from said game cartridge, game controlling means for controlling the progress of the game, and display controlling means for displaying the progress of the game on said display screen, comprising:*

*a connector on the tuner cartridge removably and electrically fittable to said connector port;*

*means for supplying television display and sound signals through said connector; and*

*means for supplying a changeover signal to said video system when said connector is inserted in said connector port so as to change the function of said video system to a mode in which television display and sound signals are supplied from said tuner cartridge and said display controlling means is enabled to display television signals on said display screen.*

* * * * *